United States Patent [19]

Theodorsen

[11] 3,999,736
[45] Dec. 28, 1976

[54] APPARATUS FOR ENCAPSULATING AN ARTICLE IN MOLDED POLYURETHANE

[75] Inventor: Theodore E. Theodorsen, Manhasset, N.Y.

[73] Assignee: Kurt Salmon Associates, Inc., New York, N.Y.

[22] Filed: Feb. 25, 1974

[21] Appl. No.: 445,229

Related U.S. Application Data

[60] Division of Ser. No. 188,755, Oct. 13, 1971, Pat. No. 3,830,895, which is a continuation-in-part of Ser. No. 874,563, Nov. 6, 1969, Pat. No. 3,642,400.

[52] U.S. Cl. .................................. 249/91; 249/157; 249/158; 249/162; 425/441; 425/817 R
[51] Int. Cl.² ......................................... B29C 6/02
[58] Field of Search ............ 264/45, 321, 54, 46.4, 264/45.4; 249/161, 162, 91, 157, 136, 139, 155, 156, 158, 159, 160; 279/112; 425/4 R, 817 R, 330, 188, 388, 441, 442, 443, 110, 125, 127, 128, 129, 292, 293, 296; 83/171, 15; 74/25, 56, 103, 104, 102, 99 R

[56] References Cited

UNITED STATES PATENTS

| | | | |
|---|---|---|---|
| 785,272 | 3/1905 | Robbins | 249/161 X |
| 1,591,558 | 7/1926 | Pike | 249/155 X |
| 1,678,266 | 7/1928 | Niestradt | 249/157 X |
| 1,816,921 | 8/1931 | Urschel | 249/155 X |
| 2,136,432 | 11/1938 | Gattuso | 249/91 X |
| 2,711,580 | 6/1955 | Conway | 279/112 X |
| 3,049,769 | 8/1962 | Schultz | 249/157 X |
| 3,642,400 | 2/1972 | Theodorsen | 249/162 X |
| 3,757,617 | 9/1973 | Fabbri | 83/171 X |
| 3,781,159 | 12/1973 | Lidl | 249/162 X |

FOREIGN PATENTS OR APPLICATIONS 544,947   6/1956   Italy ................................... 83/171

*Primary Examiner*—Richard B. Lazarus
*Assistant Examiner*—Mark Rosenbaum
*Attorney, Agent, or Firm*—Curtis, Morris & Safford

[57] ABSTRACT

An apparatus for encapsulating an article within a plastic foam material, such as polyurethane, wherein the article to be packaged is placed within a mold cavity of an adjustable mold, the walls of the mold are adjusted according to the size of the article and a liquid polymericisocyanate mix is injected into the mold cavity and allowed to react to form an insoluble, flexible, polyurethane foam which completely encapsulates the article. After the urethane has set, the mold walls are retracted and the encapsulated article is removed. The apparatus consists of a mold form having a base plate and four upstanding movable side walls which define a mold cavity. Each upstanding wall is movable with respect to the other walls thereby to allow for a wide variation in the size of the mold cavity to accommodate wide variations in article size.

17 Claims, 16 Drawing Figures

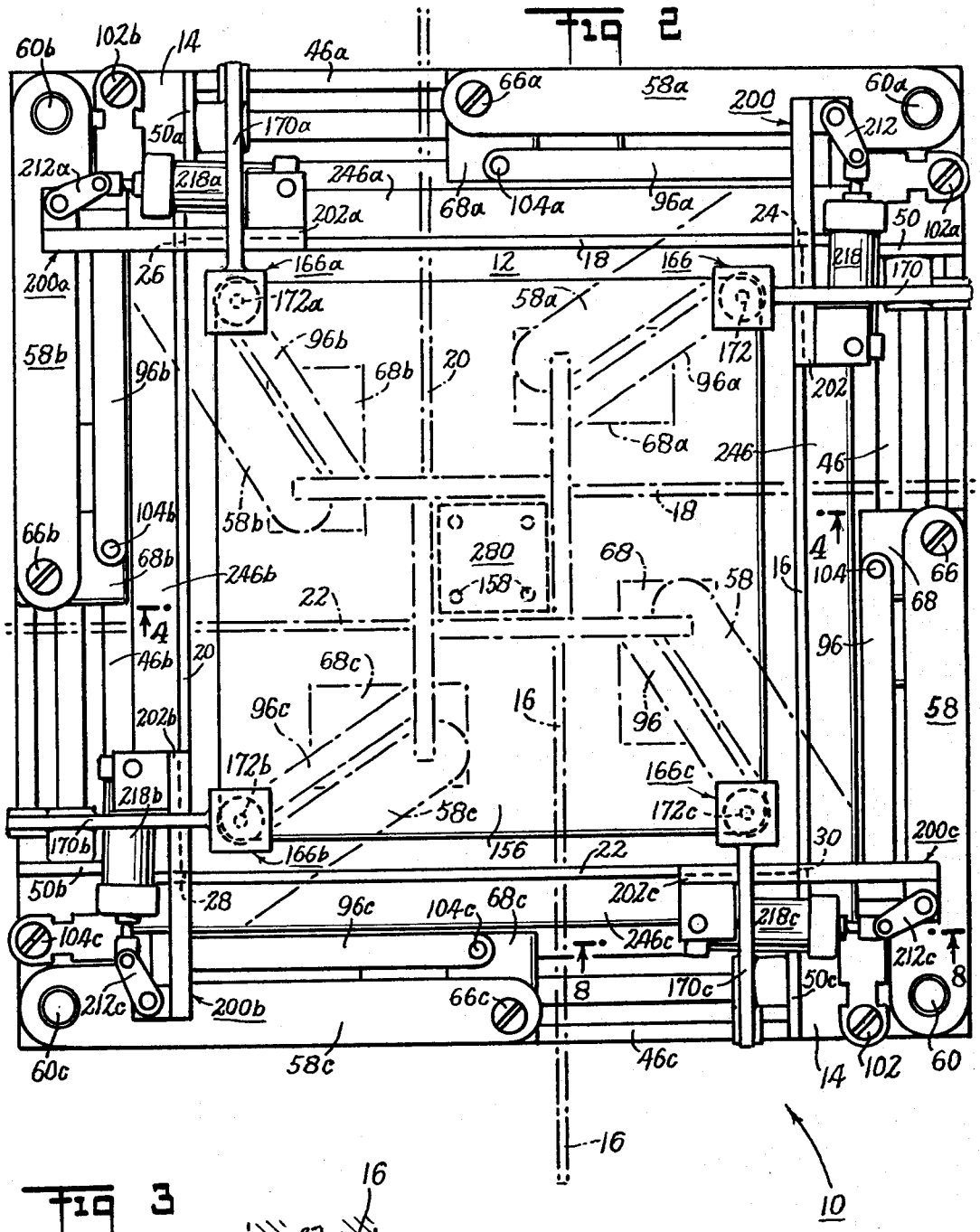
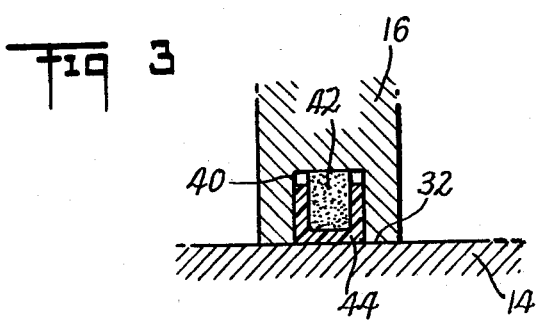

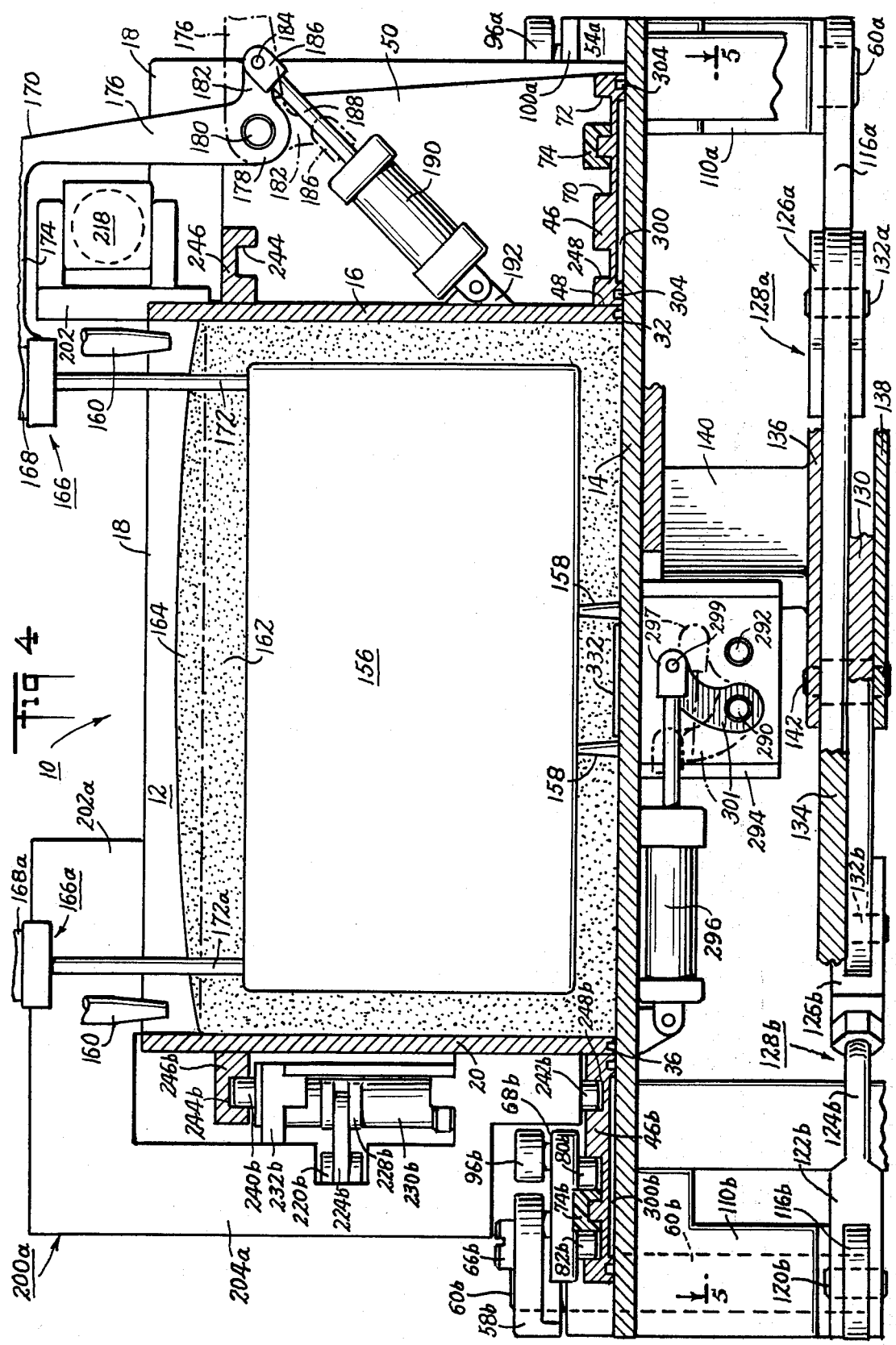

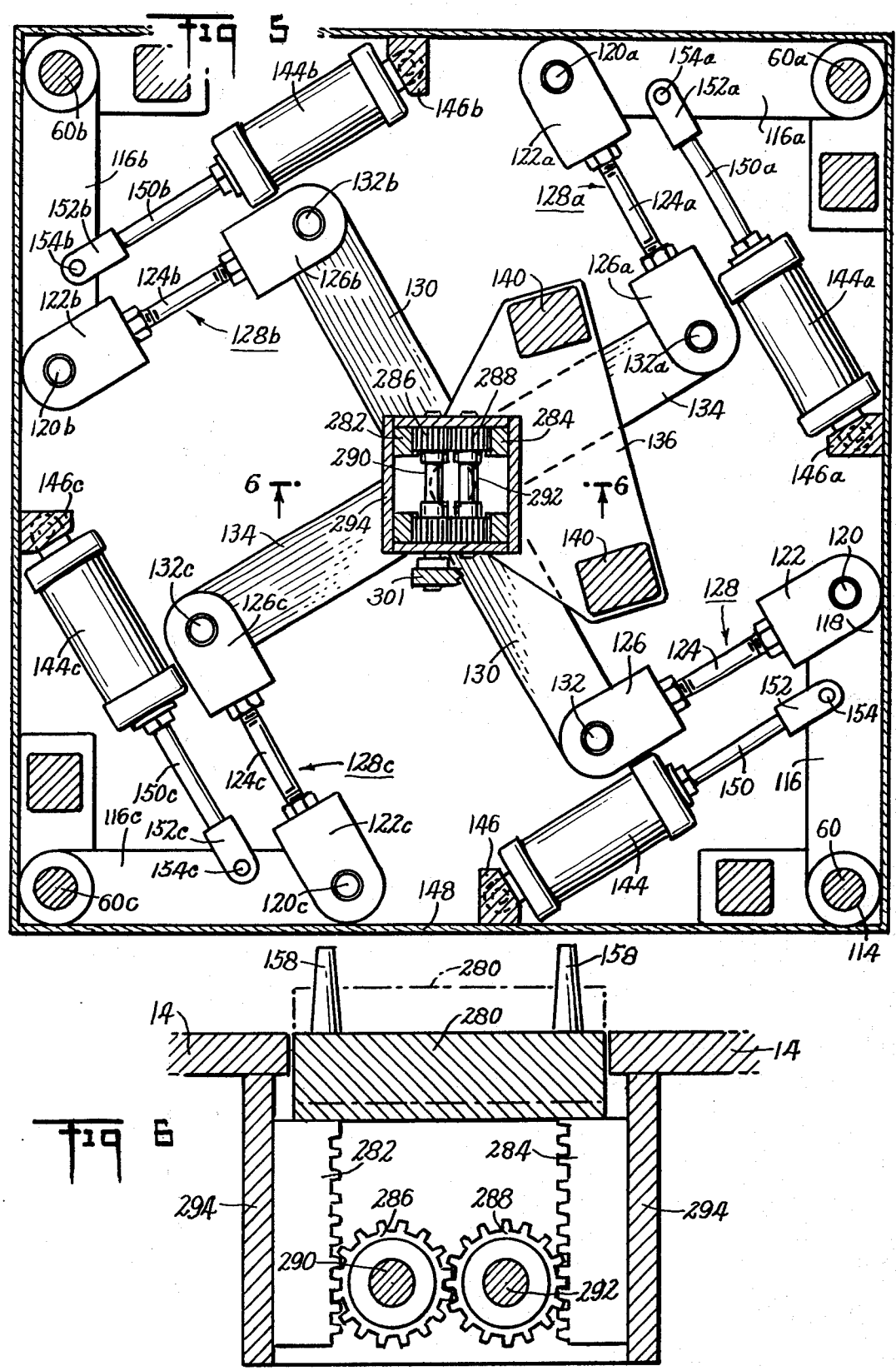

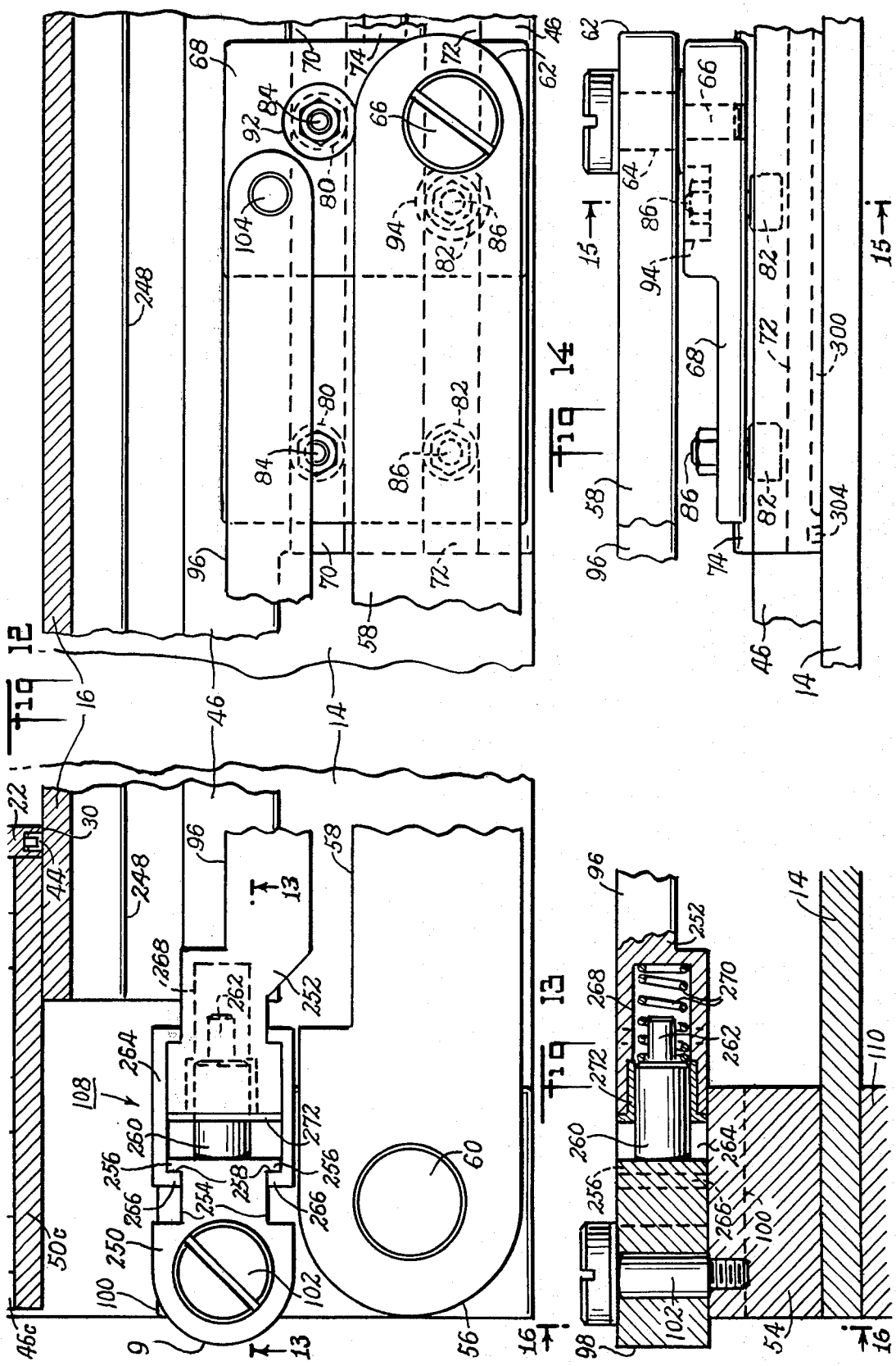

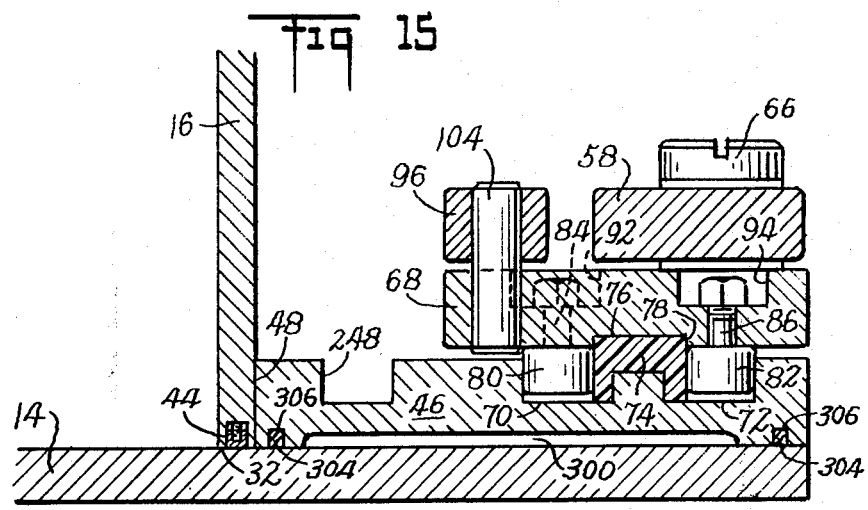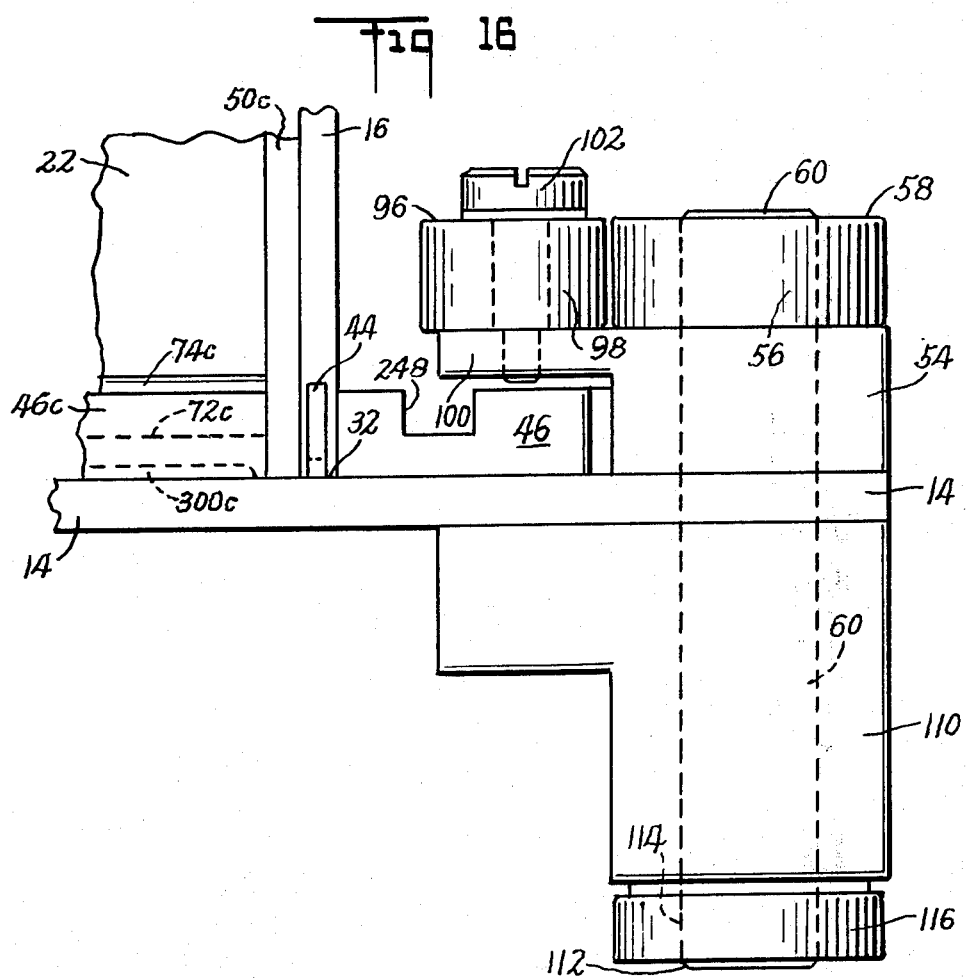

3,999,736

APPARATUS FOR ENCAPSULATING AN ARTICLE IN MOLDED POLYURETHANE

This application is a divisional of application Ser. No. 188,755, filed Oct. 13, 1971, now U.S. Pat. No. 3,830,895, which in turn was a continuation in part of prior copending application Ser. No. 874,563, filed Nov. 6, 1969, now U.S. Pat. No. 3,642,400.

This invention relates to an apparatus for preparing a package comprising an article encapsulated in a shock absorbent exterior casing, such as polyurethane or the like, and more in particular, to a method and apparatus for molding a polyurethane foam protective covering and shipping container about an article.

Concurrently, when it is desired to pack an article in a container, for example for shipping purposes, where the article must be cushioned from shocks encountered in transit, it is common to pack the article in a paperboard box within a shock absorbent protective material. Polystyrene is most commonly used and the polystyrene is first formed in a mold to obtain a solid slab having a contoured surface which mates with the exterior surfaces of the article; the article is then "sandwiched" between two or more of the styrene slabs and placed in a paperboard box which is then sealed. This procedure is inherently expensive and inflexible for limited quantity packaging application as separate molds must be provided for each article to be package, the styrene cushioning pieces must be molded in these molds and the styrene slabs and the article must be manually assembled and inserted in a paperboard box. Additionally, the paperboard boxes are shipped in a flat condition and must be prepared by opening the boxes, the styrene encased articles placed therein and the boxes sealed.

Additionally, while polystyrene is used because it sets up fast in a heated mold, for limited quantity packaging applications the necessity for using a precise mold form makes polystyrene undesirable as a cushioning for shipping articles. A material such as polyurethane is more desirable because of a greater compressive strength but has not been used heretofore because of its relatively longer set-up time in a mold.

It is, therefore, an object of the present invention to provide an apparatus for encapsulating an article within a polyurethane foam container to form a shipping container for the article without requiring the use of an outer carton.

It is another object of the present invention to provide an apparatus for encapsulating an article within a polyurethane foam plastic in a mold which is so constructed as to be adjustable to accommodate a wide range of sizes.

It is a further object of the present invention to provide an apparatus for encapsulating an article within a foamed polyurethane plastic material in a rapid and commercially feasible manner.

In a preferred embodiment of the present invention a mold which is adjustable as to size is provided consisting of a base plate with provision thereon to elevate an article to be encapsulated above the surface of the base plate. Four upstanding walls are provided which in conjunction with the base plate define a mold cavity and the walls are adjustable on the base plate thereby to vary the size of the mold cavity. In this manner, articles of varying sizes can be accommodated by the same mold structure. Once an article is placed in its elevated relationship with respect to the base plate of the mold, and each of the walls of the mold have been adjusted so as to be slightly spaced from the article therein, a foamable polyurethane mixture is sprayed into the cavity and allowed to form a polyurethane foam which completely encapsulates the article therein. Once the foam has set, the walls of the mold form are retracted and the encapsulated article is removed from the mold and can now be shipped as it is encapsulated in a solid, energy-absorbing polyurethane container.

In the Drawings:

FIG. 2 is a top plan view of the adjustable mold of the present invention;

FIG. 3 is an enlarged fragmentary view showing the seal between adjacent sliding walls;

FIG. 4 is an elevational view taken along the line 4—4 of FIG. 2;

FIG. 5 is a sectional view taken along the line 5—5 of FIG. 4;

FIG. 6 is a vertical, sectional view taken along the line 6—6 of FIG. 5;

FIG. 12 is a sectional view taken along the line 12—12 of FIG. 8 showing the parallel link arms used to move the adjustable side wall of the mold of the present invention;

FIG. 13 is a sectional view taken along the line 13—13 of FIG. 12 showing details of the compliant connection for one of the parallel link arms;

FIG. 14 is a fragmentary elevational view showing the pivotal mounting for the parallel link arms to adjust the side wall of the mold of the present invention;

FIG. 15 is a sectional view taken on line 15—15 of FIG. 14; and

FIG. 16 is a vertical sectional view taken on the line 16—16 of FIG. 13.

Figure 1:
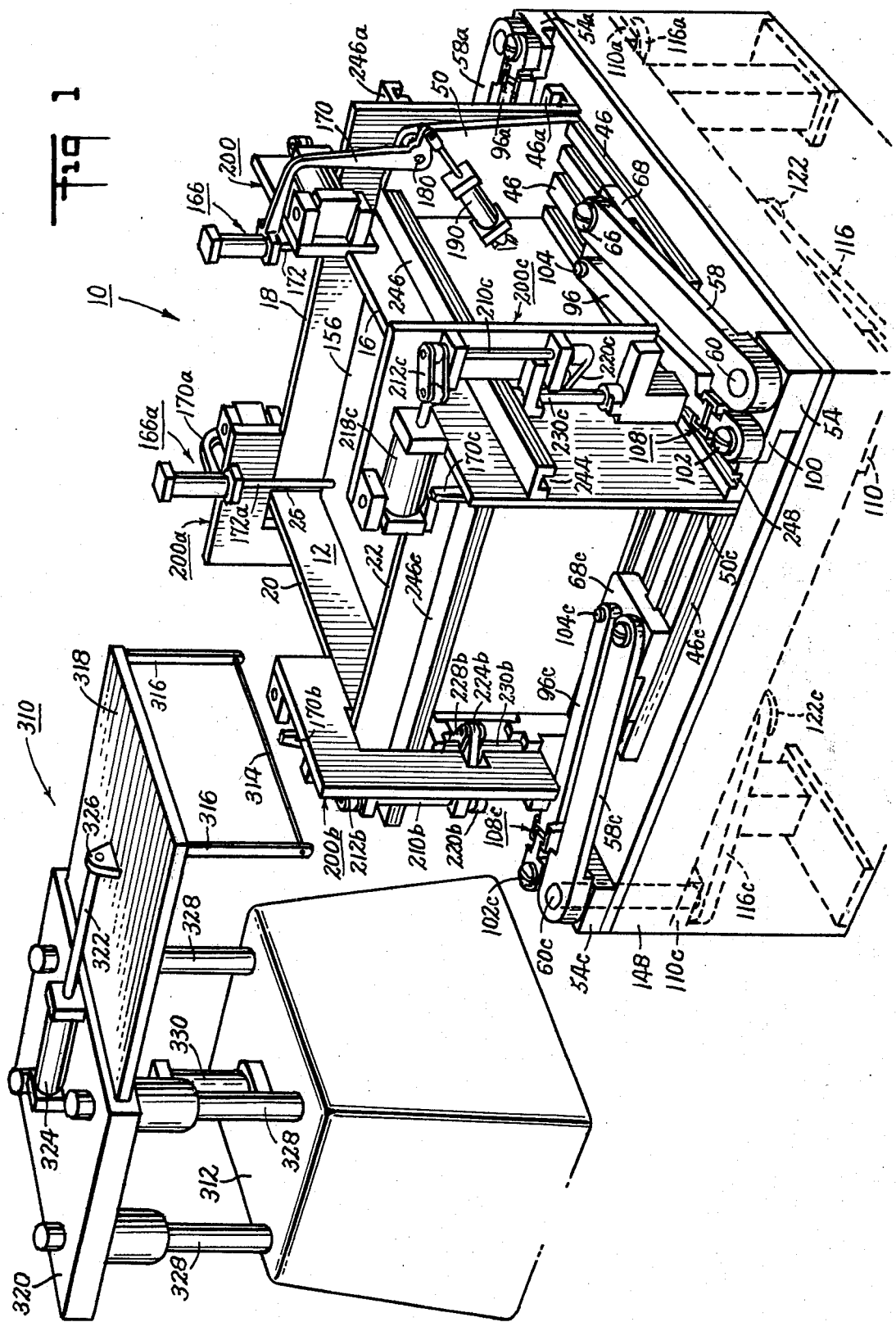
FIG. 1 is a perspective view, with certain parts omitted for clarity, showing a preferred embodiment of the adjustable mold of the present invention and an adjustable hot wire cutter to square the irregularly shaped top of the completed molded container.

With reference now to the drawings and particularly FIG. 1, an adjustable mold is provided which defines a mold cavity 12 adapted to hold an article which is to be encapsulated in a cellular plastic material, for example such as polyurethane. The mold 10 is provided with a base plate 14 which defines the lower wall of the mold cavity 12 and four upstanding side walls 16, 18, 20 and 22 disposed at right angles to each other to define the mold cavity. The upstanding walls 16, 18, 20 and 22 are adjustable along the base plate 14 to vary the size of the mold cavity 12.

A lateral face 24 of wall 16 (see FIG. 2) is parallel to, and closely abuts, the inside face of wall 18 and is adapted to slide along the inside face of wall 18 when the size of the mold cavity 12 is varied. In like manner, the lateral face 26 of wall 18, the lateral face 28 of wall 20 and the lateral face 30 of wall 22 are respectively parallel to, and closely abut, the side face of walls 16, 18 and 20. Thus, each of the lateral faces 24, 26, 28 and 30 are adapted to slide along the respective inside faces of walls 16, 18, 20 and 22 and the lower surfaces 32, 34, 36 and 38 of respective walls 16, 18, 20 and 22 are also adapted to slide along the upper surface of the base plate 14 when the size of the mold cavity 12 is increased or decreased.

To facilitate the sliding action of each of the side plates along bse plate 14, and against the inside face of the next adjacent side plate, and also to provide a non-adherent surface for the hardened polyurethane after the mold has set, the exposed faces of the mold cavity 12 are preferably coated with a coating such as tetrafluoroethylene. In addition, because the mold will be used with a mixture such as a liquid polyisocyanate which will be allowed to set and harden around the package to be encapsulated it is important that a proper sealing relationship be maintained between the side walls and the base plate. Accordingly, the bottom edges 32, 34, 36 and 38 as well as the lateral side faces 24, 26, 38 and 30 of each of the upstanding walls are provided with an internal seal.

Reference is now made to FIG. 3 which shows a representative construction for the seals which is the same for each of the surfaces to be sealed. As shown in FIG. 3, the upstanding walls 16 includes a U-shaped cutout 40 along the whole extent of the lower surface 32 and in which is housed an elastomeric band 42 within a U-shaped covering 44 of a low friction material such as tetrafluoroethylene. In like manner, each of the lower surfaces of the remaining side walls as well as the contacting lateral faces are similarly provided with low surface friction sealing means.

The size of the mold cavity is varied by moving the side walls 16–22 inwardly and outwardly along the base plate 14. Preferably, oppositely disposed plates 16 and 20 and 18 and 22 are linked together so that the opposed pairs of side plates move inwardly and outwardly in conjunction. Each of the side plates 16–22 has associated therewith linkage means to shift the respective side plate inwardly or outwardly and for each side plate the linkage means to accomplish the shifting is identical. For clarity of description, the linkage mechanism to shift the plates as well as all other structural features will be described for one of the side plates, i.e., side plate 16, and the same numerical character designation will be used with the subscript a, b and c for corresponding elements for the side plates 18, 20 and 22, respectively.

With reference to FIGS. 4, 5, 7, 15 and 16 as well, a guide plate 46 is secured to the lower portion of the exterior face of side plate 16 with guide plate 46 being secured to side plate 16 along the whole extent of the abutting lateral face 48 of the guide plate. A support bracket 50 is also provided joined to the forward edge 52 of guide plate 46 and the exterior surface of side plate 16.

A support block 54 is mounted on base plate 14 preferably at the exterior corner thereof and provides a support to pivotally mount one end 56 of pivot arm 58 to base plate 14. End 56 of pivot arm 58 is rigidly secured to a pivot shaft 60 which is in turn pivotally journaled by suitable bearing means within support block 54. The other end 62 of pivot arm 58 is provided with a throughbore 64 in which is housed a pintle 66. The pintle 66 is pivotally secured within a slide block 68 adapted to reciprocally slide along guide plate 46. To facilitate reciprocal movement of slide block 68 along guide plate 46, the guide plate 46 (see FIG. 15) is provided with undercut channel segments 70 and 72 in its upper surface defining parallel guide tracks. A U-shaped guide channel 74 is also provided spanning the parallel tracks 70 and 72 and having an upper surface 76 slightly elevated above surface of guide plate 46. Slide block 68 is provided with an undercut channel segment 78 on its lower surface to slidingly receive the exposed portion of channel 74 therein and, in addition, slide block 68 is provided with a pair of depending guide rollers 80 to ride within channel 70 and a pair of depending guide rollers 82 to ride within channel 72. The rollers 80 and 82 are rotatably mounted on support shaft 84 and shaft 86, respectively, which are maintained below the upper surface of slide block 68 within counterbores 92 and 94, respectively. Preferably, the clearance within channels 70 and 72 is maintained to insure that the rollers 80 and 82 maintain rolling contact with both sides of guide channels 70 and 72.

An auxiliary pivot arm 96 is also provided spaced inwardly, of and parallel to, pivot arm 58. Auxiliary pivot arm 96 has one end 98 pivotally mounted to an extending lug 100 of support block 54, for example by a pintle 102 (see FIG. 16) and has its other end pivotally secured to slide block 68 by a pivot pin 104 (see FIG. 15). Auxiliary pivot arm 96 is offset as at 106 and includes a compliant segment 108 which will be described more fully hereinafter.

The primary motive force for shifting side plates 16 inwardly or outwardly along base plate 14 is transmitted through pivot arm 58. With reference to FIG. 1, when pivot arm 58 is pivoted counterclockwise about its pivot shaft 60, end 62 of pivot arm 58 pivots about pintle 66 and slide block 68 slides along guide plate 46 toward the central pivot point 60 resulting in inward movement of side plates 16. Conversely, if pivot arm 58 were rotated in a closewise direction, slide plate 68 moves along guide plate 46 away from pivot point 60 and retracts side plate 16 from an inward position to a more outward position on base plate 14. Auxiliary pivot arm 96 since it is keyed to pivot arm 58 through slide block 68 would move in conjunction with pivot arm 58 and maintain a parallel orientation with pivot arm 58 as well.

Figure 7:
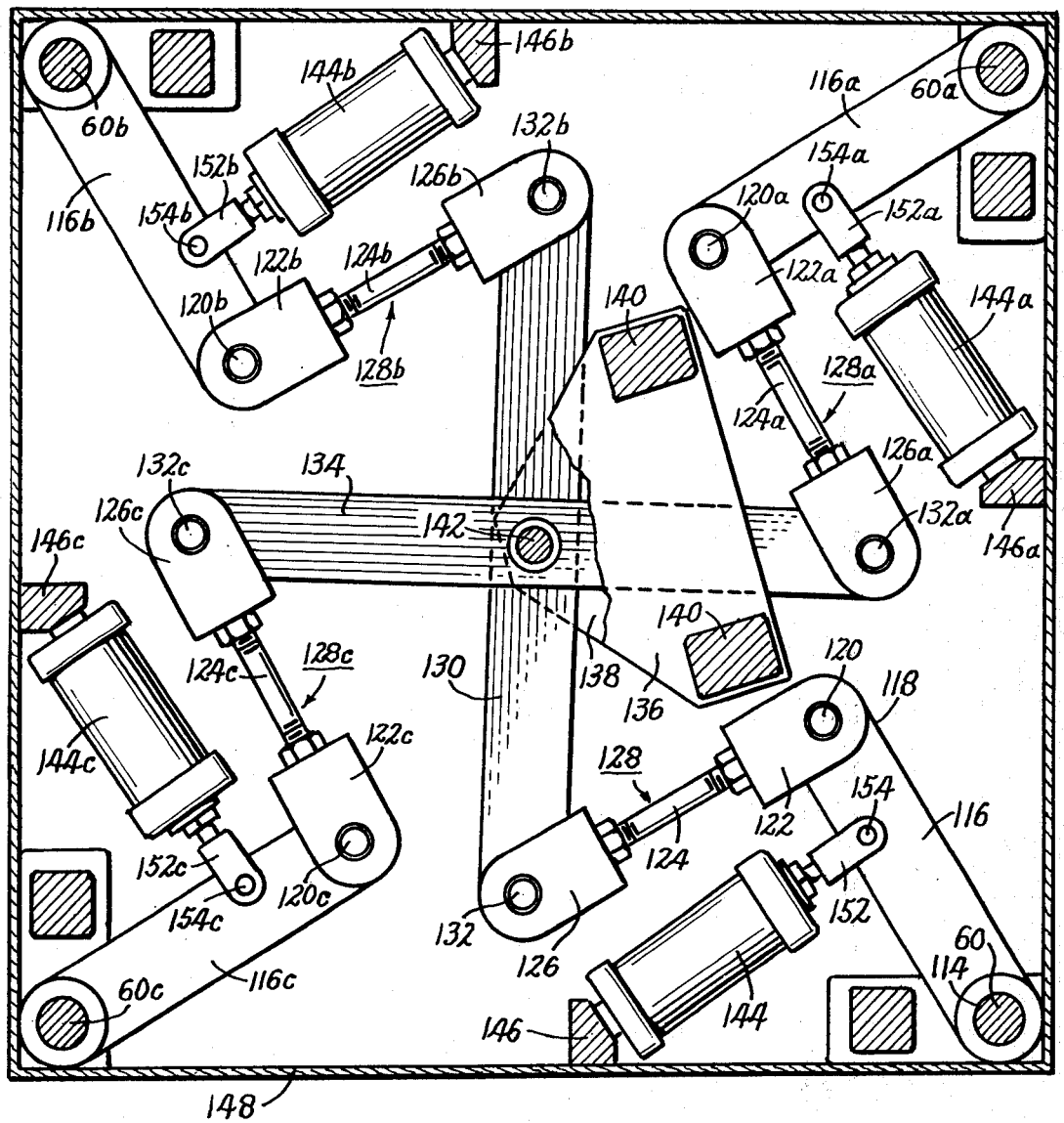
FIG. 7 is a plan view similar to FIG. 5 showing the mechanism for adjusting the adjustable walls of the mold of the present invention.

With reference to FIGS. 4, 5 and 7 as well, it is seen that shaft 60 extends below base plate 14 and is journaled within a support housing 110 fixed to the underside of base plate 14 and has its exposed end 112 rigidly secured within a throughbore 114 in one end of a link arm 116. The link arm 116, while rigidly secured to shaft 60, is free to pivot so as to rotate shaft 60 thereby transmitting a rotative motion to pivot arm 58. The other end 118 of link arm 116 is pivotally secured, for example by a pivot pin 120, to a bifurcated bracket 122. Bifurcated bracket 122 is linked by an adjustable screw shaft 124 to a second bifurcated bracket 126 to form a fixed link arm 128 which may be adjusted as to its length by rotating screw shaft 124 joining the bifurcated brackets 122 and 126.

The bifurcated bracekt 126 of link arm 128, which is associated with side wall 16, and the bifurcated bracket 126b of link arm 128b, which is associated with opposing side wall 20, are each pivotally secured to opposite ends of a connecting link member 130, for example by pivot pin 132 and 132b, respectively. Thus, connecting link member 130 cooperatively joins opposing side wall members 16 and 20 so that side wall members 16 and 20 move inwardly and outwardly along base plate 14 in conjunction. In like manner, bifurcated bracket 126a, which is associated with side wall 18, and bifurcated bracket 126c which is associated with side wall 22, are pivotally secured to connecting link member 134 by pivot pins 132a and 132c, respectively. Connecting link members 130 and 134 are independently pivotally mounted at their approximate mid points between spaced plate members 136 and 138 (see FIG. 4).

Plates 136 and 138 are secured to the underside of base plate 14 and spaced therefrom by a pair of bracket supports 140 and the plates 136 and 138 in turn mount a pivot support member 142 upon which the connecting link members 130 and 134 are independently pivotally secured. Thus, when connecting link member 130 pivots about pivot support 142 link arms 128 and 128b move to impart pivoting movement to link arms 116 and 116b which in turn pivot the pivot arms 58 and 58b causing side walls 16 and 20 to move with respect to base plate 14. In like manner, pivoting of connecting link 134 about pivot support 142 will result in inward or outward movement of side plates 18 and 22.

While it is to be understood that electrical, mechanical or hydraulic means may be used to pivot the linkage mechanisms to move the side plates relative to base plate 14, preferably, pneumatic means such as air cylinders are employed to pivot the link arms. Accordingly, movement of each of the side plates is in response to the extension and retraction of the working piston member of a pneumatic cylinder. While the preferred embodiment of the invention shows a separate pneumatic cylinder to power the primary linkage arm associated with each side plate, it is evident that since opposing side plates are linked together the apparatus could be constructed using but two pneumatic cylinders.

As best seen in FIGS. 5 and 7, where FIG. 5 shows the linkage mechanism when the side plates are in a fully retracted position and FIG. 7 shows the same linkage mechanism when the side plates are in an inward position, it is seen that a pneumatically actuated cylinder 144 is provided for link arm 116. The cylinder 144 is mounted beneath base plate 14 with its rear end fixed to a bracket support 146 mounted on a skirt plate 148 depending from the periphery of the base plate 14. An extensible member 150 of pneumatic cylinder 144, which is operatively associated with the working piston member of the pneumatic cylinder, includes a bifurcated bracket 152 attached to its free end which is pivotally connected, as at 154, to a mid-portion of link arm 116. Thus, as pneumatic cylinder 144 is actuated, in a conventional manner from a source of pressurized air (not shown), member 150 extends and retracts to pivot link arm 116 about the axis of pivot shaft 60 thereby rotating shaft 60 and pivoting link arm 58 as well to move the side plate members on base plate 14 to vary the size of the mold cavity. FIG. 5 shows the positions of various linkage mechanisms with the side plates fully retracted to maximize the size of mold cavity 12 and FIG. 7 shows the same linkage mechanisms with the extension members 150 of the cylinders in a retracted position corresponding to the side plates of the mold being in an inward position to minimize the size of the mold cavity 12.

As best seen in FIG. 4, an article 156 to be encapsulated in the mold 10 is supported above base plate 14 on a plurality of pins 158 to allow the liquid polymeric mix which is injected into the mold to flow under the article. The pins 158 are preferably conically shaped or frusto-conically shaped so that after the polyurethane has foamed and set and the side walls of the mold retracted to free the encapsulated article, the polyurethane encapsulated article may be freed from contact with the base plate with little resistance. As indicated in FIG. 4, the article to be encapsulated is placed within the mold cavity and the side walls of the mold are adjusted so that the walls are predeterminedly spaced from the article and a liquid polymeric-isocyanate mix from a dispenser apparatus, which may be any commercially available polyurethane foam machine such as the Model 19011 Froth-Foam Machine manufactured by Pyles Industires, is dispensed from dispensing nozzles 160 and allowed to flow into the mold cavity 12. The liquid then froths, expands and sets to form an encapsulating envelope 162 which has a domed upper surface 164 much like the domes upper surface of a loaf of bread.

Because the polymeric-isocyanate mix injected into the mold cavity 12 is initially in a liquid state, the article to be encapsulated 156 has a tendency to float once the liquid level rises above the uppermost elevation of the pin supports 158 and accordingly it is desirable to restrain the article to preclude the tendency for the article to float. Thus, a hold-down mechanism is provided associated with each of the side walls in order to positively restrain the article to be encapsulated.

Accordingly, each of the side walls has associated therewith a holddown device 166. the holddown device 166 includes a pneumatic cylinder 168 mounted on a bell crank arm 170 and including an extensible member 172 operatively connected to the working piston member of the pneumatic cylinder which is adapted to extend and retract. Member 172 in its extended position, as shown in FIG. 4, is adapted to contact one corner of the article 156 to be encapsulated and, as each of the side walls has a holddown mechanism associated therewith, each of the extensible members 172, 172a, b and c contact a corner of the article while it is in the mold cavity.

In order to facilitate placement and removal of the article from within mold cavity 12, the holddown mechanisms are adapted to swing away from the operative position as shown in FIG. 4 so as to be clear of the confines of mold cavity 12 so that an article can be readily placed or removed from the mold cavity. Bell crank arm 170 is substantially L-shaped with one leg 174 being the support leg to mount pneumatic cylinder 168 and the other leg 176 including an elbow 178 which is pivotally secured, as at 180 to support bracket 50. The elbow 178 includes a lug 182 which is pivotally secured, as at 184, to a bifurcated bracket 186. Bracket 186 is fixed to the end of an extensible member 188 of a pneumatic cylinder 190 with the member 188 being operatively associated with the working piston member of the cylinder 190 and being extensible and retractable from cylinder 190 thereby to pivot the bell crank arm 170 from the full line position shown in FIG. 4 to the broken line position. Cylinder 190 is fixed to the exterior surface of side plate 16 in any suitable manner, for example, by a bracket plate 192. Thus, when cylinder 190 is actuated to retract member 188, bell crank 170 pivots about its pivot support 180 to swing the holddown mechanism 166 to free the mold cavity 12 from obstruction so that an article may be freely removed or placed within the confines of the mold.

After an article has been encapsulated within a urethane envelope 162, as shown in FIG. 4, the hardened and set urethane foam exhibits a high degree of adhesion to the surfaces of the side walls 16, 18, 20 and 22 even though the side walls are coated with a low friction coating such as tetrafluoroethylene. Thus, after the mold has set and hardened and when it is desired to retract the side walls to remove the completely encapsulated article from the mold cavity considerable force must be applied to the walls in order to break the cohesive force between the hardened urethane foam and the side wall. To alleviate the problem of cracking the side walls from the hardened urethane foam, each side wall is provided with an auxiliary mechanism to change the angular relationship between the next adjacent side wall to initiate cracking of the side wall from the side of the hardened urethane envelope.

With particular reference to FIGS. 1 and 8 through 11, it is seen that each of the side walls is linked to an adjacent perpendicularly disposed side wall by an L-shaped link plate 200. Link plate 200 has one leg 202 fixed to the upper edge of side wall 22 and its other leg 204 substantially parallel to, and spaced from the outer surface of side wall 16. In like manner, link plates 200a, b and c are similarly disposed with respect to the remaining side walls. Leg 204 of link plate 200 is connected to side wall 16 through a linkage assembly which is pneumatically actuated to move side wall 16 relative to side wall 22 from a first position wherein side wall 16 is intimately butressed against the edge of side wall 22 and a second position where side wall 16 is cracked away from engagement with side wall 22. Movement of side wall 16 from the first position to the second position initiates cracking of the side plate from the urethane foam envelope.

Figure 9:
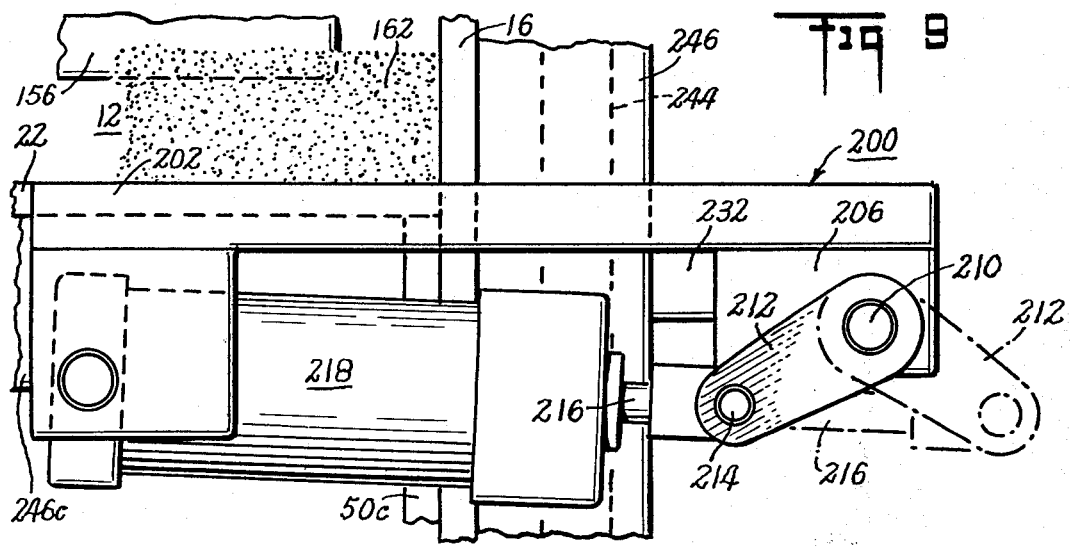
FIG. 9 is an enlarged fragmentary view showing the mechanism for cracking one of the side walls away from an adjacent side wall.

As best seen in FIG. 9, the connecting linkage assembly comprises a pair of support brackets 206 and 208 fixed to leg 204 of link plate 200 which rotatably support a pivot shaft 210. One end of a pivot link 212 is rigidly secured to the upper portion of pivot shaft 210 and its other end is pivotally connected, as at 214, to an extensible member 216 of a pneumatic cylinder 218 with cylinder 218 being fixed to leg 202 of link plate 200. Actuation of pneumatic cylinder 218 causes the extension and retraction of member 216, which is operatively associated with the working piston member of cylinder 218, and results in the rotation of the pivot link 212 from the full line position shown in FIG. 9 to the broken line position. Since the pivot link 212 is rigidly fixed to pivot shaft 210, shaft 210 is rotated when member 216 extends and retracts.

The lower portion of pivot shaft 210 is rigidly fixed within one end of a pivot link 220 which has its other end pivotally connected, as at 222, to a connecting link 224. Connecting link 224 is in turn pivotally secured, as at 226, between a pair of lug members 228 rigidly secured to, and extending from, a pivot shaft 230.

Pivot shaft 230 is rotatably journaled within spaced support blocks 232 and 234 fixed to leg 204 of link plate 200 and each end of pivot shaft 230 is provided with short extension shaft segment 236 and 238, respectively, with the longitudinal axis of the extension shaft portions 236 and 238 being offset from the longitudinal axis of shaft 230. The extension shafts 236 and 238 act as a hub for rollers 240 and 242, respectively, with roller 240 adapted to rotate within a slot 244 of a guide block 246 fixed to the exterior surface of side plate 16 and roller 242 adapted to rotate within a slot 248 within guide plate 46. The rollers 204 and 242 permit the link plate assembly to slide along guide plate 46 when the position of side plate 16 is changed.

Figure 8:
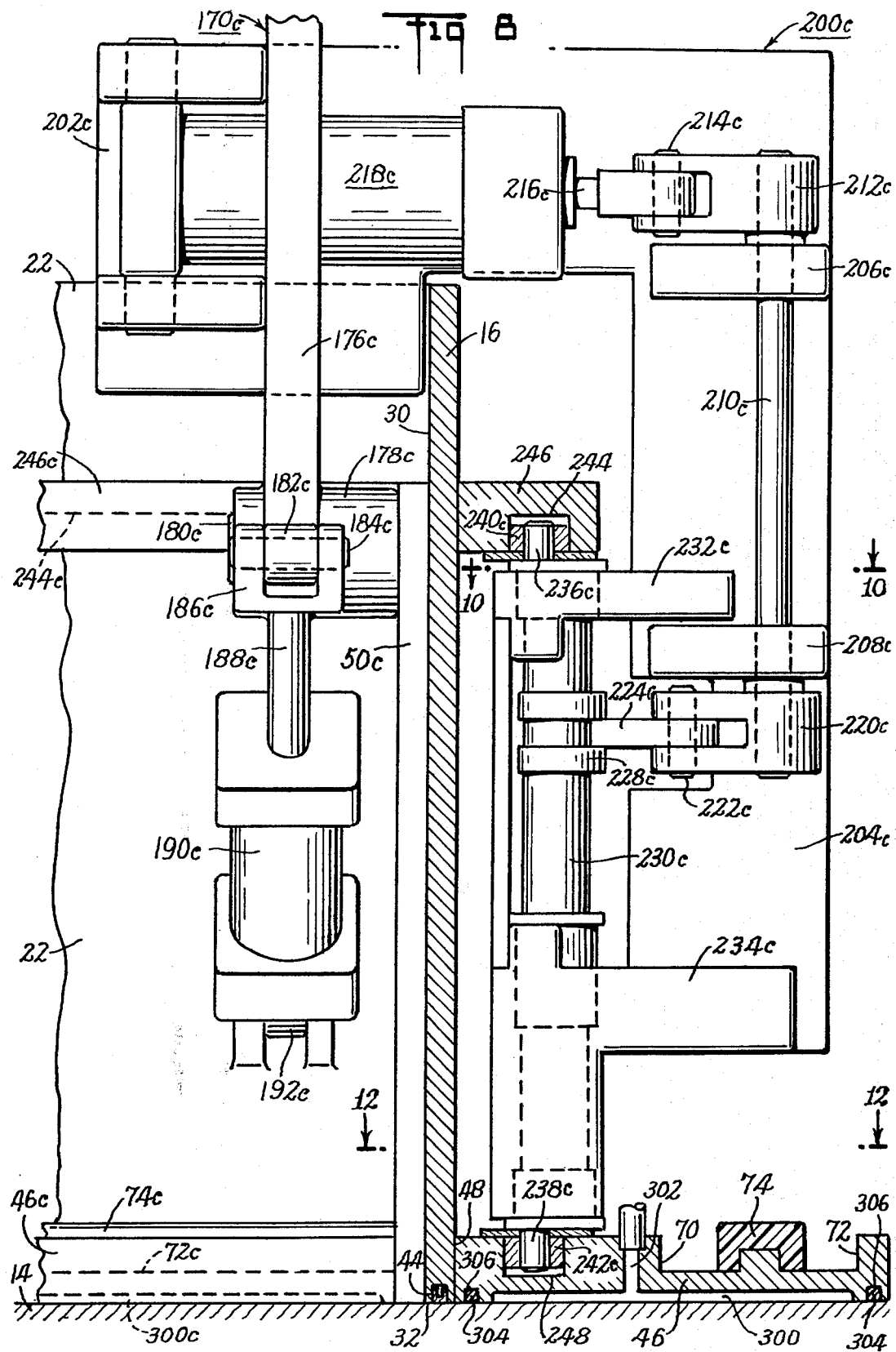
FIG. 8 is an elevational view taken along the line 8—8 of FIG. 2.
Figure 10:
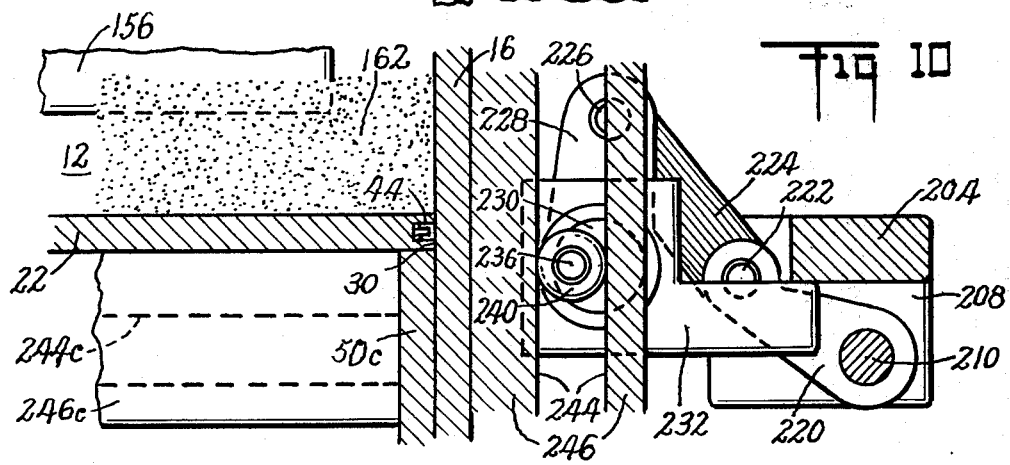
FIG. 10 is a sectional view taken along the line 10—10 of FIG. 8 showing the mechanism for cracking one of the side walls away from an adjacent side wall.
Figure 11:
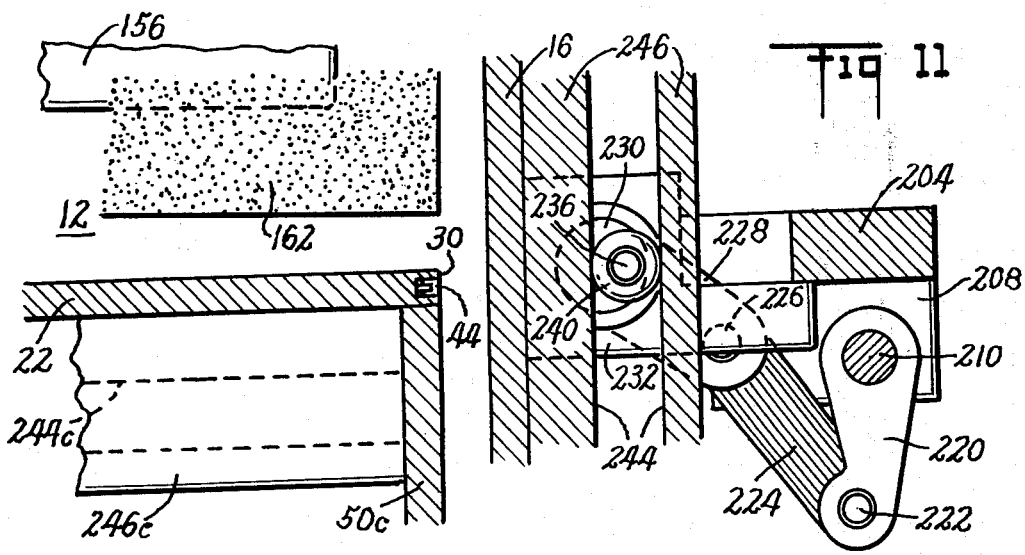
FIG. 11 is a view similar to FIG. 10 showing the apparatus after the side wall has been cracked away from an adjacent side wall.

With particular reference to FIGS. 8, 10 and 11, it is seen that when cylinder 218 is actuated to retract member 216, as shown in the full line position of FIG. 9, pivot shaft 210 rotates thereby rotating pivot link 220, connecting link 224 and lugs 228 to the position shown in FIG. 10. Rotation of lugs 228 rotates pivot shaft 230 as well so that the offset extension shaft segments 236 and 238 are closest to side wall 16 thus forcing side wall 16 in close abutting relationship to side wall 22. When member 216 of cylinder 218 is extended to the broken line position, as shown in FIG. 9, shaft 210 is rotated to rotate pivot link 220 to the position shown in FIG. 11. Rotation of pivot link 220 in this manner draws connecting link 224 which pivots the lugs 228 about the axis of shaft 230 to rotate the extension shaft segments 236 and 238 to the position shown in FIG. 11. This rotation of the offset shaft segments 236 and 238 cracks side wall 16 from intimate engagement with side wall 22 and angularly displaces the side wall 16 relative to side wall 22. The angular displacement of side wall 16 frees the side wall from intimate contact with the urethane foam envelope about the article after it has been encapsulated.

In order to accommodate the change in angular relationship between adjacent normally perpendicularly disposed side walls, auxiliary arm 96 is provided with a compliant portion to accommodate the change in angular relationship between adjacent side walls when the side wall is cracked open to free itself from initimate contact with the molded urethane envelope. With particular reference to FIGS. 12 and 13, the compliant portion 108 of auxiliary pivot arm 96 is a connecting segment between a first segment 250 and a second segment 252 of the auxiliary pivot arm 96. Segment 250 includes a pivot pin 102 and a necked down portion 254 terminating in side flanges 256 which form shoulders 258. A cylindrical segment 260 extends axially from segment 250 and includes an integral cylindrical stub 262 of smaller diameter than the diameter of cylindrical extension 260.

Portion 252 of auxiliary pivot arm 96 includes a collar 264 including inwardly extending ears 266 adapted to fit within cutout 254 of segment 250 and to bear against the shoulder 258 of flanges 256. Segment 252 also includes a receiving bore 268 to house a relatively stiff compression spring member 270 which also fits about the cylindrical stub 262 of segment 250. A slide bushing 272 is also provided between the sleeve 264 and cylindrical extension to facilitate the sliding movement of segment 252 on segment 250.

Thus, when the side walls 16 and 22 are in a perpendicular relationship the force of the compression spring member 270 urges segment 252 of auxiliary pivot arm 96 away from segment 250 and the movement of segment 252 away from 250 is arrested by the bearing relationship of the ears 266 of sleeve 264 on shoulders 258. When the angular relationship between side wall 16 and 22 changed, limited sliding movement of segment 252 relative to segment 250 results as spring 270 is compressed and sleeve 264 moves within the cutout 254 until the ears 266 bear against the rearward face of cutout 254. As soon as the angular relationship of adjacent walls 16 and 22 is once again perpendicular, compression spring 270 urges segment 252 to auxiliary pivot arm 96 outwardly until the ears 266 abut the shoulders 258. With reference now to FIGS. 4 and 6, it is seen that support pins 158 to support the article 156 above the surface of base plate 14 are mounted within a block 280 which can be moved with respect to base plate 14 from a normal position, wherein the surface of the block is flush with the surface of base plate 14, to additional positions where the block is elevated with respect to the surface of base plate 14 and also recessed below the surface of base plate 14. Affixed to the lower portion of block 280 are vertically extending rack members 282 and 284 each having geared teeth thereon to mesh with a pair of pinions 286 and 288 rigidly secured to pinion support shafts 290 and 292, respectively. The pinions 286 and 288 are also adapted to mesh with each so that rotation of one pinion rotates the other pinion thereby vertically moving the racks 282 and 284 and the block 280. The pinion support shafts 290 and 292 are rotatably mounted within a housing 294 fixed to the underside of base plate 14. As best seen in FIG. 4, a pneumatic cylinder 296 is fixed to the underside of base plate 14 and includes an extensible member 298 operatively associated with the working piston member of pneumatic cylinder 296 which is provided with a bifurcated bracket 297 at its end. The bracket 300 is pivotally secured, as at 299 to a lever 301 which is rigidly fixed to pinion support shaft 290. The extension and retraction of member 298 is controlled, in any suitable manner, to three discrete positions, as shown in FIG. 4, with the central position of the extension, indicated in full line, corresponding to the position of block 280 when the upper surface of the block is flush with the upper surface of base plate 14. At the furtherest point of the extension of member 298, block 280 is elevated above the surface of plate 14 and at the fully retracted position of rod extension 298 block 280 is recessed below the surface of base plate 14 so that the upper surfaces of support pins 158 are below the surface of base plate as well.

The elevation and retraction of block 280 is utilized in freeing the encapsulated article from initimate contact with base plate 14. After the mold has hardened and set, the side plates have been cracked free of contact with the sides of the urethane mold and the domed upper surface 164 removed, block 280 is elevated to break the cohesive bond between the bottom of the polyurethane envelope 162 and base plate 164. Cylinder 296 is again actuated to retract block 280 below the surface of base plate 14 thus freeing the pins 158 from the bond with the lower portion of the urethane envelope 162. After the pins 158 have been freed from the bond with the envelope 162 the encapsulated article may be removed from the mold cavity 12.

As described above, intimate contact between the adjacent side walls is maintained by linking plate 200 and the associated pneumatic cylinder 218 which ties adjacent perpendicular side walls together and also insures a tight sealing engagement between adjacent side walls. in addition, link plate 200 links the adjacent side walls together so that when side wall 16 is retracted, for example, side wall 22 will move laterally with side wall 16 maintaining the integrity of the mold cavity 12. In like manner, each of the other pairs of adjacent side walls are linked together so that extension and retraction of opposing side walls will necessarily move the other pair of opposing side walls laterally as well.

To insure a tight sealing engagement between the lower edges of each of the side walls and base plate 14, the undersurface of the guide plates 46, a, b and c are provided with a channel 300 in the lower surface of the plate communicating with an air passageway 302 (see FIG. 8) which is in turn in communication, selectively, with a source of air under pressure or evacuating means (not shown). The underside of guide plate 46 is also provided with suitable seals 304 in a peripheral channel 306 about the channel 300. When the side plates are moved along base plate 14 passage 302 is placed in communication with a source of air under pressure so that pressurized air flows into the channel 300 and provides a slight lifting action beneath the guide plate 46 which in turn lifts the side plate slightly to facilitate movement along base plate 14. After the side plate has reached its desired placement passageway 302 is selectively switched to communication with the means to evacuate air and a vacuum is impressed across the passageway 302 thus evacuating the channel 300. The vacuum formed within channel 300 draws guide plate 46 and the associated side wall more firmly into intimate contact with the base plate 14 providing a tight sealing engagement between the lower edge of the side wall and the base plate.

Reference is again made to FIG. 1 where there is shown a hot wire cutter which may be used to remove the upper domed portion 164 of the urethane envelope from the completed encapsulated mold, if so desired. The hot wire cutter 310 is preferably mounted on a movable base member 312 and includes a hot wire cutting element 314 mounted between a pair of spaced depending support legs 316 carried by a slide panel 318. The slide panel 318 is mounted for reciprocal sliding movement within a support plate 320 and reciprocates relative to plate 320 in response to the extension and retraction of extensible member 322 of a pneumatic cylinder 324. Pneumatic cylinder 324 is fixed to plate 320 and the end of member 322 is secured to slide panel 318 by a suitable fixed bracket 326.

Plate 320 is vertically extensible and retractable and is slidably supported on vertically disposed support legs 328 extending from base member 312. A pneumatic cylinder 330 secured to the base member 312 has its extension member (not shown) secured to the underside of plate 320 so that plate 320 is raised and lowered responsive to the actuation of pneumatic cylinder 330.

In operation, the side walls 16, 18, 20 and 22 are withdrawn to their fully retracted position and a suitable label 332 (see FIG. 4) is placed face down on block 280 within the confines of the support pins 158. The article 156 to be encapsulatd is placed on the support pins 158 and the side walls are moved inwardly to contact the article and center it on the support pins 158. The side walls are then retracted a predetermined distance to provide the desired thickness of the urethane envelope about the article and the holddown mechanisms 166 are actuated to contact the top of the article to prevent its floatation once the liquid isocyanate mix is injected into the mold cavity. The liquid mix is now injected into the mold cavity and allowed to harden and set and form a rigid urethane envelope 162 about the article. The holddown mechanisms 166 are retracted and pivoted out of the way, each of the side walls are then cracked away from the side of the envelope 162 by actuation of the cylinders 200, a, b and c and then the side walls are completely retracted.

Prior to freeing the encapsulated article from base plate 14, the hot wire assembly 310 is placed next to the mold 10, cylinder 330 is actuated to retract the platform so that the hot wire 314 is at the proper level to slice the domed top 164 of the envelope and cylinder 324 is actuated to extend slide plate 318 and pass the hote wire 314 completely through the domed portion 164 of the urethane envelope. The hot wire cutter is then retracted and cylinder 296 is actuated to elevate block 280 to free the bottom surface of the urethane envelope 162 from intimate contact with base plate 14 and block 280 is retracted to fully withdraw the support pins 158 from the envelope. The label 332 remains with the urethane envelope and when the article is removed the label will be readily visible.

While the basic function of the operating mechanisms of the variable mold have been described, it is readily apparent that suitable control functions to actuate the various pneumatic cylinders are provided and preferably the control functions are performed by a fluidic circuit which forms no part of the present invention but the construction of which is readily apparent to those skilled in the art. In addition, it is contemplated that the position of the side walls and the degree of extension of the holddown element 172 will be used to determine the volumetric requirement for the amount of liquid isocyanate mix which must be injected into the mold cavity in order to provide sufficient mix so that after the mix has foamed and set the article will be completely encapsulated in a urethane envelope. Such a measurement can be readily determine from the extent of the retraction of members 150 of the pneumatic cylinders 144 which actuate the movement of the side plates as well as the extension of members 172 of the pneumatic cylinders 168.

It is thus seen that the present invention provides a variable mold cavity to encapsulate an article within an envelope of urethane foam where the size of the mold cavity may be selectively varied to conform to the size of the article to be encapsulated. While a preferred embodiment of the present invention has been described and disclosed herein it is to be expressly understood that the description is not meant to be limiting in any way as refinements and modifications may be evident to those skilled in the art.

I claim:
1. Apparatus for encapsulating an article within an energy-absorbing solid material comprising:
   an adjustable mold form,
   said mold form including a base plate defining a bottom of said mold form and at least four upstanding wall members which together with said base plate define an enclosed mold cavity,
   each said wall being movable with respect to the other walls and said base plate thereby to provide a finite variation in the size of the mold cavity,
   each said wall being normally disposed perpendicular to an adjacent wall with one vertical edge being in sliding contact with the inside face of the next adjacent wall and the opposed vertical edge being free standing and not in contact with another upstanding wall,
   a pivot arm for each said side wall having one end pivotally fixed to said base plate outside the confines of said mold cavity and its other end operatively slidably connected to the exterior of a side wall along said base plate to move an associated sidewall toward and away from an opposed wall member when said pivot arm is pivoted about its one end.

2. Apparatus as defined in claim 1 wherein each said side wall includes a guide plate fixed to the exterior surface thereof, a guide block slidably disposed on said guide plate and said other end of said pivot arm pivotally secured to said guide block wherein as said pivot arm is pivoted about said one end said guide block slides along said guide plate thereby to correspondingly move the associated side wall.

3. Apparatus as defined in claim 2 wherein said guide plate includes a first channel therein parallel to the exterior surface of said side wall and said guide block includes a roller member depending therefrom cooperatively engaged within said channel thereby to roll within said channel as said guide block slides along said guide plate.

4. Apparatus as defined in claim 2 wherein said guide plate is provided with an undercut region in its lower surface defining a recess therein, an access bore in said guide plate communicating with said recess, means associated with said apparatus to selectively direct air under pressure to, and impress a vacuum across, said access bore and said recess.

5. Apparatus as defined in claim 1 wherein each said pivot arm pivotally mounted to said base plate comprises a pivot shaft rotatably journaled through said base plate having one end rigidly secured within said pivot arm and its other end rigidly secured within one end of a link member, means mounted to said base plate to pivot said link member about the axis of said pivot shaft thereby imparting a corresponding pivoting action to said pivot arm to move the associated side wall along said base plate.

6. Apparatus as defined in claim 5 wherein said means to pivot said link member comprises a pneumatic cylinder fixed to said base plate having an extensible member operatively associated with the working piston member of said cylinder fixed to an intermediate portion of said link member.

7. Apparatus as defined in claim 5 wherein the link members associated with opposing side walls are joined by a connecting link pivotally secured to the other end of each said opposing link members thereby to move opposing side walls inwardly and outwardly along said base plate in conjunction.

8. An adjustable mold form for use in encapsulating an article within a solid energy-absorbing envelope comprising:
   a base plate defining a bottom wall of a mold form,
   four upstanding side walls each perpendicular to another and perpendicular to said base plate to define an enclosed mold cavity,
   each of said upstanding side walls being slidably disposed on said base plate and positioned with one lateral edge abutting the next adjacent side wall and with the other lateral edge not in contact with the upstanding wall,
   means operably connected to opposed pairs of upstanding side walls to cause said walls to move in opposite directions, and
   means slidably interconnecting abutting upstanding walls in the vicinity of the abutting lateral edge for maintaining contact between said abutting walls when either wall is moved relative to the other.

9. Apparatus as defined in claim 8 wherein said means slidably interconnecting abutting upstanding walls comprises a link plate fixed to the upper edge of a side wall adjacent the abutting lateral edge and overlying the next adjacent side wall and means slidably interconnecting said next adjacent side wall to the overlying portion of said link plate.

10. Apparatus as defined in claim 9 wherein said link plate comprises a substantially L-shaped plate member having one leg fixed to the upper edge of a side wall and its other leg substantially parallel to and spaced from the rear surface of the next adjacent side wall, said means slidably interconnecting said side wall to said link plate including a pair of space guide plates fixed to the rear surface of said adjacent side wall each said guide plate having a guide track therein, a shaft member slidably disposed at each end within said guide tracks and said shaft member including linking means mounted intermediate its ends linking said shaft member to said other leg of said link plate.

11. Apparatus as defined in claim 10 wherein said shaft member includes at each end extension shaft segments having a longitudinal axis offset from the longitudinal axis of said shaft member, said extension shaft segments providing a hub to rotatably mount a roller member thereon with said roller members being disposed within said guide tracks and means operatively associated with said linking means to rotate said shaft member from a first position wherein said extension shaft members are adjacent said rear surface to a second position spaced further away from said rear surface thereby to angularly displace said next adjacent side wall from said side wall from a position wherein said side walls are held in closely abutting relationship to a second position wherein said next adjacent side wall is spaced from the lateral edge of said side wall.

12. Apparatus as defined in claim 8 including means associated with said base plate to elevate an article to be encapsulated above the surface of said base plate to permit said encapsulating medium to completely envelope said article.

13. Apparatus as defined in claim 12 wherein said means to elevate said article comprises a block member within said base plate including support pins extending from said block member adapted to support said article above the surface of said base plate, said block member including means to move said block member between a first position wherein the surface of said block member is flush with the surface of said base plate, a second position wherein the surface of said block member is elevated above the surface of said base plate and a third position wherein the support surface of said support pins is below the surface of said base plate.

14. Apparatus as defined in claim 13 wherein said means to move said block member includes a pair of spaced vertically disposed rack members fixed to the undersurface of said block member, a pair of pinions mounted on pinion support shafts adapted to mesh with said rack members and with each other and means to rotate at least one of said pinion support shafts thereby to vertically displace said rack members and said block member.

15. Apparatus as defined in claim 12 including means to dispense a foamable liquid polymeric-isocyanate mixture within said mold form which upon foaming and setting completely encapsulates an article within a solid, energy-absorbing envelope.

16. Apparatus as defined in claim 15 including means to square the upper surface of said solid encapsulating envelope after said mixture has foamed and set.

17. Apparatus as defined in claim 16 wherein said means to square the upper surface of said solid encapsulating envelope comprises a hot wire cutter, said hot wire cutter including a base support and a vertically extensible platform mounting a laterally extensible slide panel, said slide panel including a pair of spaced depending support legs supporting said hot wire cutter therebetween.

* * * * *